United States Patent [19]
Saito et al.

[11] Patent Number: 5,442,495
[45] Date of Patent: Aug. 15, 1995

[54] ALIGNMENT TAPE FOR MAGNETIC RECORDING AND PLAYBACK DEVICES AND DEVICE FOR PRODUCING THE SAME

[75] Inventors: Kenji Saito; Masahiko Sumigama, both of Kanagawa, Japan

[73] Assignee: Mitsumi Electric Co., Ltd., Kanagawa, Japan

[21] Appl. No.: 171,120

[22] Filed: Dec. 21, 1993

[30] Foreign Application Priority Data

Dec. 21, 1992 [JP]  Japan .................. 4-340352

[51] Int. Cl.⁶ .................. G11B 15/14; G11B 5/027
[52] U.S. Cl. .......................... 360/64; 360/58
[58] Field of Search .......... 360/58, 64, 61, 46, 360/48, 78.06, 78.08, 77.15, 77.14; 324/227, 528

[56] References Cited

U.S. PATENT DOCUMENTS

3,582,217  6/1971  Trist ........................... 356/172
3,852,815  12/1974  Ljudmirsky et al. ............ 360/75
4,254,440  3/1981  Martin ........................ 360/76
4,303,950  12/1981  Taniguchi et al. ............. 360/64 X

*Primary Examiner*—Donald Hajec
*Assistant Examiner*—Thien Mihn Le
*Attorney, Agent, or Firm*—Peter Jon Gluck; Morrison Law Firm; Thomas R. Morrison

[57] ABSTRACT

An alignment tape for magnetic recording and playback devices contains recorded tracks useful for aligning the tape path on a rotating drum. The recorded tracks are spaced apart a sufficient distance to avoid interference from adjacent recorded tracks when the playback head is off-track. The alignment tracks are spaced apart a distance equal to the distance normally occupied by three tracks. This ensures that interference from an adjacent track when the head is off-track is minimized or eliminated. An apparatus is disclosed for controlling the recording of the alignment tape.

2 Claims, 7 Drawing Sheets

ALIGNMENT TAPE FOR MAGNETIC RECORDING AND PLAYBACK DEVICES AND DEVICE FOR PRODUCING THE SAME

BACKGROUND OF THE INVENTION

This invention relates to alignment tapes for magnetic recording and playback devices and devices for producing the same. More particularly, the invention relates to an alignment tape for aligning the linearity of tracks in magnetic recording and playback devices, which create tracks using a rotating head, as used for example, in digital audio tape recorders (DAT), 8 mm video tape recorders and VHS type video tape recorders.

Conventional helical scan magnetic recording and playback devices include digital audio tape recorders (DAT) and 8 mm video tape recorders. In these helical scan magnetic recording and playback devices, a magnetic tape is driven forward and wound at a specified angle around a drum rotating at a high speed, having magnetic heads fixed thereon.

In order to perform high-density recordings, a pair of magnetic heads (head A and head B) with differing azimuth angles ($\alpha$) are fixed on a rotating drum displaced 180° from each other about the circumference of the rotating drum. Head A is set with azimuth angle $\alpha = +20°$ and head B with azimuth angle $\alpha = -20°$. The magnetic heads record on alternating tracks. Tracks recorded by one of the heads lie adjacent to the tracks recorded by the other of the heads.

Figure 9A:
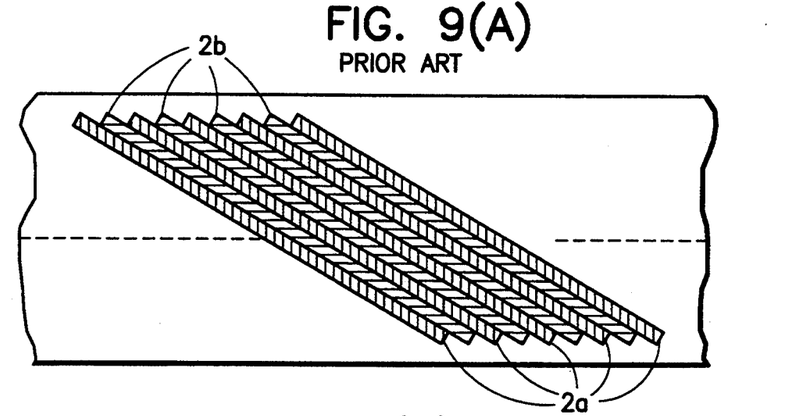
FIG. 9(A) is a track format of a prior art high-density recorded tape.

Referring to FIG. 9(A), the track format of such a high-density recorded tape is shown. Tracks $2a$ are recorded by one of the heads with an azimuth angle of $+20°$. Tracks $2b$ are recorded by the other head with an azimuth angle of $-20°$. The 40-degree difference in azimuth angles between tracks $2a$ and $2b$ reduces adjacent-track interference when reproducing the recorded information.

Figure 9B:
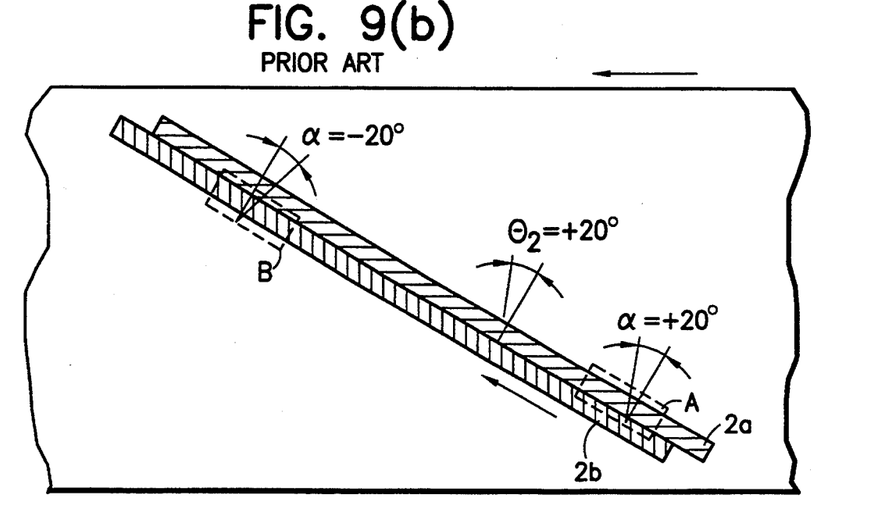
FIG. 9(B) is a detail of the track format as shown in FIG. 9(A).

Referring now also to FIG. 9(B), a detailed view of a prior art high-density track format shows heads A and B (broken lines) and their relationship to two adjacent tracks $2a$ and $2b$ with azimuth angles $\alpha = +20°$ and $-20°$ respectively. Arrows indicate the directions of tape and head travel.

Figure 10:
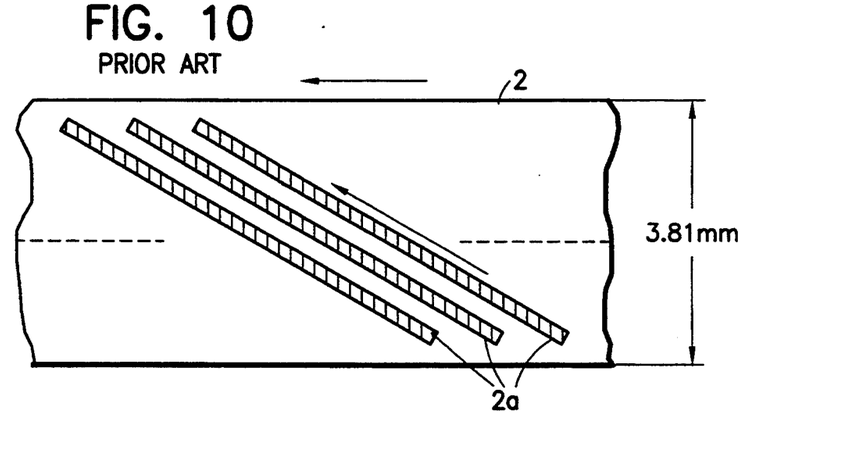
FIG. 10 is a track format of a prior art alignment tape.

Referring now to FIG. 10, a conventional alignment tape for aligning a helical scan magnetic includes an alignment track $2a$ on a magnetic tape 2. Alignment track $2a$ is recorded according at a skew angle specified by DAT standards (indicated by the upward sloping arrow). The signal is recorded at a frequency that permits the playback envelope waveform to be easily observed (normally about 2.35 Mhz). For purposes of alignment, magnetic tape 2 need not be recorded with every track filled. In fact, if every track were recorded, adjacent-track interference of such a high-density recording interferes with accurate observation of the playback envelope waveform. Consequently, alignment track $2a$ is recorded only by head A having an azimuth angle, $\alpha = +20°$. The intervening tracks, normally recorded by head B remain blank. In this way, every other track is recorded by the same magnetic head with the same azimuth angle of $= +20$.

It should be noted that the rotating drum may have either two heads or four heads.

Figure 12A:
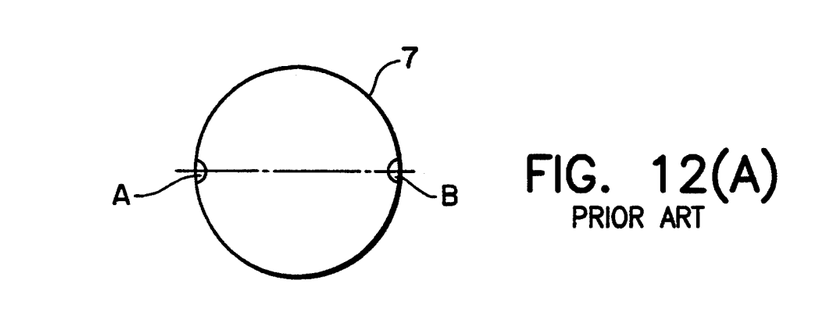
FIG. 12(A) is a prior art device having two heads.

Referring now to FIG. 12(a), rotating drum 7 includes two heads A and B located 180° from each other about the circumference of rotating drum 7. Heads A and B are used for both recording and playback.

Figure 12B:
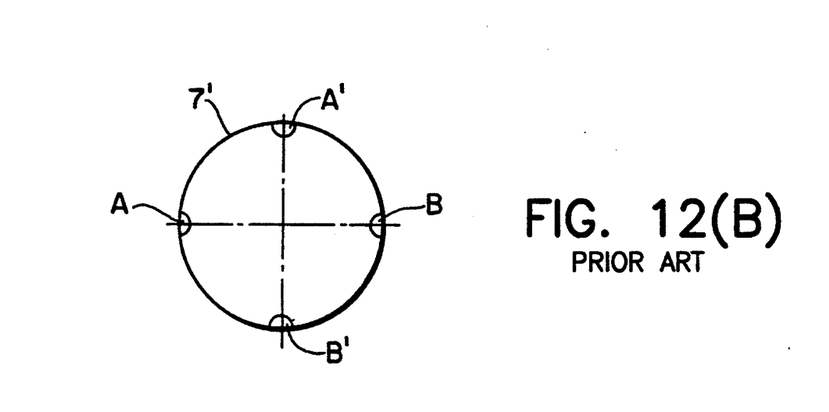
FIG. 12(B) is a prior art device having four heads.

Referring now to FIG. 12(b), a rotating drum 7' includes four heads A, B', B and A' 90 degrees apart about the circumference of rotating drum 7'. Heads A and B, located 180° apart, are used only for recording. Heads A' and B', also located 180° apart are used only for playback. Playback heads A' and B' are offset from recording heads A and B by 90°.

Figure 7:
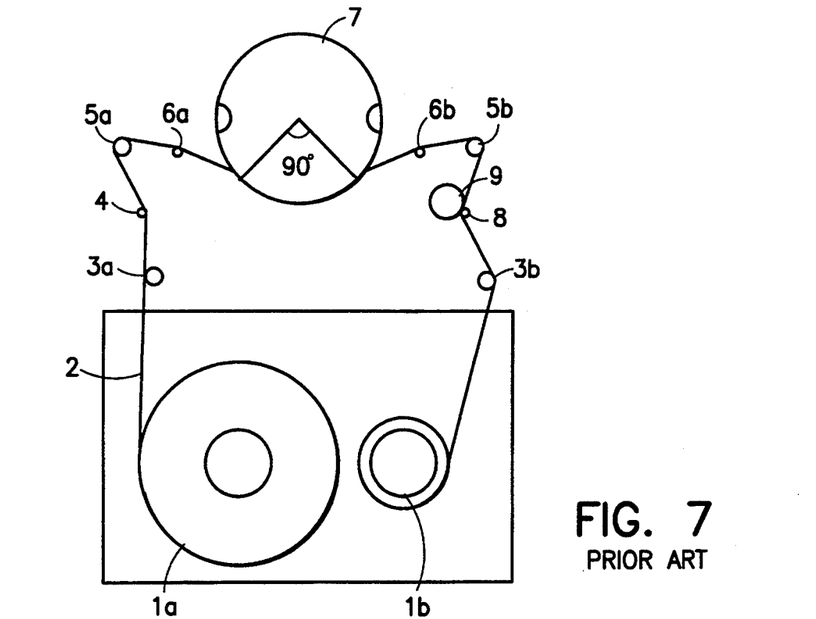
FIG. 7 is a prior art DAT tape path.

Referring now to FIG. 7, a typical DAT tape path is shown. A magnetic tape 2 is drawn out from a supply side reel $1a$. Magnetic tape 2 is guided to give 90° of mobile contact between its surface and a peripheral surface of a rotating drum 7. On the upstream side, magnetic tape 2 is guided by a supply side stabilizing post $3a$, a tension post 4, an incoming side guide roller $5a$, and an incoming side inclined post $6a$. On the downstream side magnetic tape 2 is guided by an outgoing side inclined post $6b$, an outgoing side guide roller $5b$, a capstan 8 opposed by a pinch roller 9 and a take-up stabilizing post $3b$ to a take-up reel $1b$.

More specifically, supply side stabilizing post $3a$ maintains magnetic tape 2 at a fixed angle with respect to tension post 4, regardless of changes in the take-up quantity of magnetic tape 2 from supply side reel $1a$. Tension post 4 is spring-loaded to maintain a constant tension in magnetic tape 2 by moving in accordance with the changes of tension in magnetic tape 2.

Capstan 8 and pinch roller 9 provide the driving force for magnetic tape 2. Capstan 8 rotates against a surface of magnetic tape 2 squeezed against pinch roller 9 to draw magnetic tape 2 toward take-up reel $1b$. Take-up side stabilizing post $3b$ maintains a fixed angle of magnetic tape 2 with respect to an axis of capstan 8 and pinch roller 9, regardless of the amount of magnetic tape wound on take-up reel $1b$.

Figure 8A:
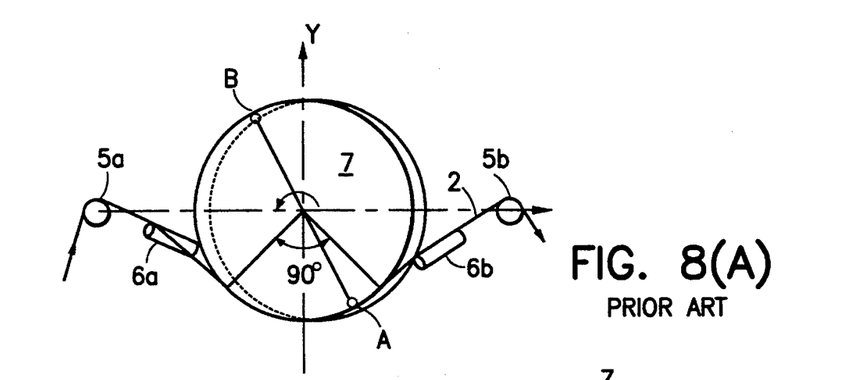
FIG. 8(A) is a prior art alignment device.
Figure 8B:
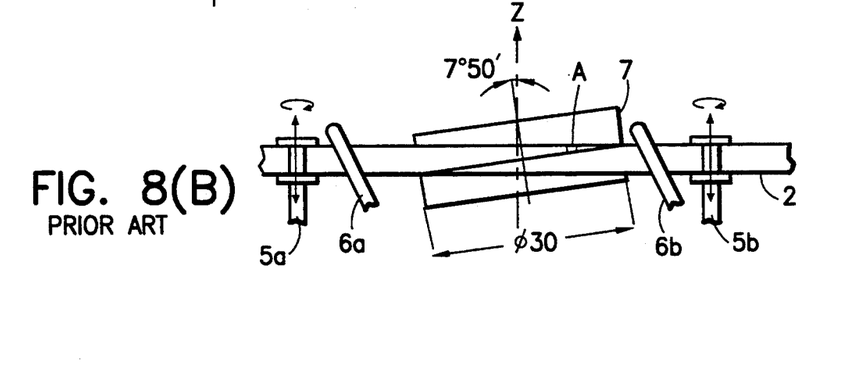
FIG. 8(B) is a side perspective of the prior art device of FIG. 8(A).

Referring now also to FIGS. 8(A) and 8(B), the contact position and contact angle of magnetic tape 2 against rotating drum 7 is determined by incoming side guide roller $5a$, incoming side inclined post $6a$, outgoing side inclined post $6b$ and outgoing side guide roller $5b$.

In the prior art device described, rotating drum 7 has a diameter of 30 mm and a contact angle of magnetic tape 2 against rotating drum 7 of 90°. A rotation axis of rotating drum 7 is inclined at an angle of 7° 50' to the travel direction of magnetic tape 2. This inclination creates an inclined track.

Magnetic tape 2 is maintained in full contact with the peripheral surface of rotating drum 7, aligned at the desired contact position and contact angle, by incoming side guide roller $5a$, incoming side inclined post $6a$, outgoing side inclined post $6b$ and outgoing side guide roller $5b$.

In these types of helical scan magnetic recording and playback devices, it is essential that the material recorded be accurately laid down on the tracks in accordance with the proper format and that upon playback, the recorded tracks be accurately tracked. For these reasons, the angle and vertical positioning of the tape path against rotating drum 7 has to be precise. Various factors, including manufacturing tolerances, may degrade accurate alignment following assembly of the recorder. The device may therefore require further adjustment to correct the alignment.

Alignment is controlled by the path alignment mechanism to maintain the correct tape path. The tape path is aligned by moving incoming side guide roller $5a$ and outgoing side guide roller $5b$ up and down until the desired tape path is attained. Shafts of incoming side guide roller 5a and outgoing side guide roller 5b are screws which permit loosening, repositioning of their respective guide rollers 5a and 5b, and then tightening.

Figure 11A:
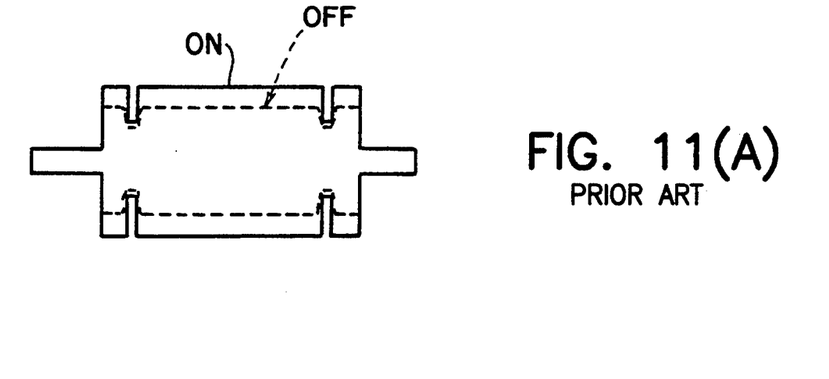
FIG. 11(A) is a playback waveform from a prior art alignment tape.
Figure 11B:
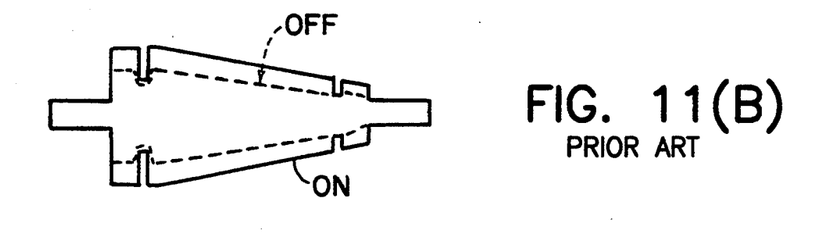
FIG. 11(B) is another playback waveform from the prior art alignment tape of FIG. 11(A).

Referring now also to FIGS. 11(A) and 11(B), an envelope waveform of the playback signal produced by an alignment tape indicates the nature of the adjustment to be performed on incoming side guide roller 5a and outgoing side guide roller 5b to properly align the tape mechanism.

Referring specifically to FIG. 11(A), the envelope waveform of a playback signal is shown produced by a properly aligned magnetic head. A solid line indicates an on-track state and a dashed line indicates an off-track state. The magnetic head scans the specified track from entry to exit, to produce a flat envelope waveform.

Referring now to FIG. 11(B), an envelope waveform of a playback signal is shown that is produced by magnetic head reproducing a signal from a misadjusted tape path, and in which alignment of the tape path is necessary. The solid line indicates an on-track state and the dashed line indicates an off-track state. The magnetic head gradually shifts from alignment with the track at track entry, to misalignment at track exit. The amplitude of the playback signal thus diminishes from high amplitude at entry to low amplitude at exit. An opposite situation is possible wherein the magnetic head enters the track misaligned and reaches substantial alignment at exit. The track angle of the magnetic tape is adjusted so that the track angle is aligned with the tracks of the alignment tape by adjusting the heights of incoming side guide roller 5(a), or outgoing side guide roller 5(b), or both.

As shown above, prior art alignment tapes for magnetic recording and playback devices have an alignment track created every other track. Since the alignment track intervals are small, the adjacent track may be played back during an off-track state, as shown by the dotted lines in FIGS. 11(A) and 11(B). A relatively large playback signal is displayed on an oscilloscope as a result of mixing on-track and off-track signals. Thus, despite the fact that alignment tracks are recorded on every other track, a strong signal interference still exists between adjacent alignment tracks. This makes it difficult to use the displayed envelope waveform for aligning the tracks.

OBJECTS AND SUMMARY OF THE INVENTION

Accordingly, it is an object of this invention to provide an alignment tape for magnetic recording and playback devices, which eliminates the drawbacks of the prior art.

It is another object of the invention to provide an alignment tape for magnetic recording and playback devices which allows for easier and more reliable alignment.

It is still another object of the invention to provide a sufficient interval between alignment tracks to minimize signal interference from adjacent tracks.

Briefly stated, an alignment tape for magnetic recording and playback devices contains recorded tracks useful for aligning the tape path on a rotating drum. The recorded tracks are spaced apart a sufficient distance to avoid interference from adjacent recorded tracks when the playback head is off-track. The alignment tracks are spaced apart a distance equal to the distance normally occupied by three tracks. This ensures that interference from an adjacent track when the head is off-track is minimized or eliminated. An apparatus is disclosed for controlling the recording of the alignment tape.

According to an embodiment of the present invention, an alignment tape comprises a plurality of recorded tracks, the plurality of recorded tracks being skewed at an angle to a direction of travel of the alignment tape and parallel with one another, each of the plurality of recorded tracks being displaced from an adjacent one of the plurality of recorded tracks by a predetermined period, the predetermined period being an even multiple of a track width of each of the plurality of recorded tracks, and the even multiple being at least four.

According to another embodiment of the present invention, a device for producing alignment tapes for a magnetic recording and playback device comprises the magnetic recording and playback device being of a type effective for playing back a plurality of adjacent recorded tracks on a magnetic tape, a rotating drum having at least one magnetic head disposed therein, means for outputting a predetermined oscillation signal, and means for sending the predetermined oscillation signal to the magnetic head at a rate of once for each of a set of four tracks, whereby at least three blank tracks are disposed between each of the plurality of adjacent recorded tracks.

According to still another embodiment of the present invention, a record signal generation circuit for an alignment tape recorder comprises the alignment tape recorder including means for generating a drum rotation pulse signal having positive and negative half cycles, the alignment tape recorder further including means for dividing the drum rotation pulse signal by two to produce a divided drum rotation pulse signal having positive and negative half cycles, the alignment tape recorder further including means for producing a servo signal, an oscillator producing an oscillation signal, logic means for taking a logic product of the rotation pulse signal, the divided drum rotation pulse signal, the servo signal and the oscillation signal to produce an output signal at a frequency of the oscillation signal occurring once for every fourth occurrence of the servo signal.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
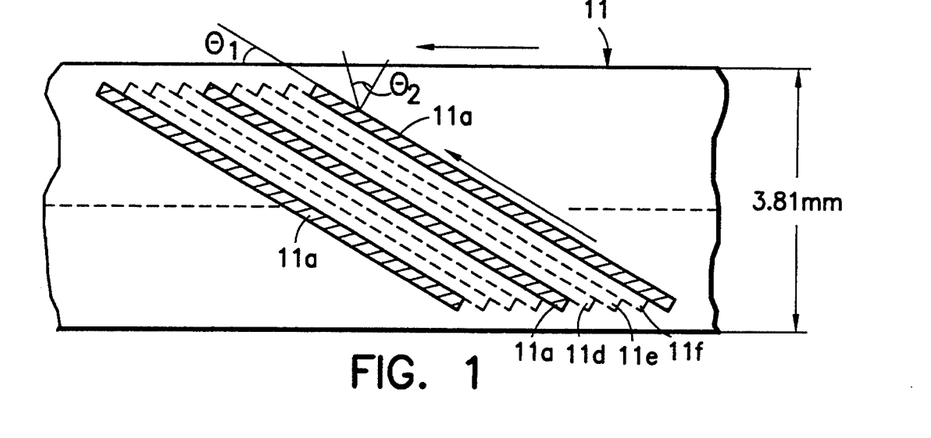
FIG. 1 is a drawing of a track format of an embodiment of the alignment tape according to the present invention.

Referring to FIG. 1, a track format on a magnetic side of a DAT magnetic tape 11 used for an alignment tape is shown. DAT magnetic tape 11 has a standard tape width of 3.81 mm. An alignment track 11a is recorded with a track angle $\theta 1$ of 6° 22' 59.5".

Alignment track 11a is recorded every fourth track by a magnetic recording head 37 (not shown in FIG. 1), with an azimuth angle $\alpha = +20°$. Blank tracks 11d, 11e, and 11f are disposed between each pair of alignment tracks 11a. An azimuth angle of the recorded data on alignment track 11a, designated $\theta 2$, corresponds to that of magnetic recording head 37, to wit +20°. The relatively wide, three-track, blank region between a pair of alignment tracks 11a reduces or eliminates interfering signals from the blank tracks, and thus permits accurate alignment of the angle and position of the magnetic tape, using an oscilloscope display (not shown).

Figure 2:
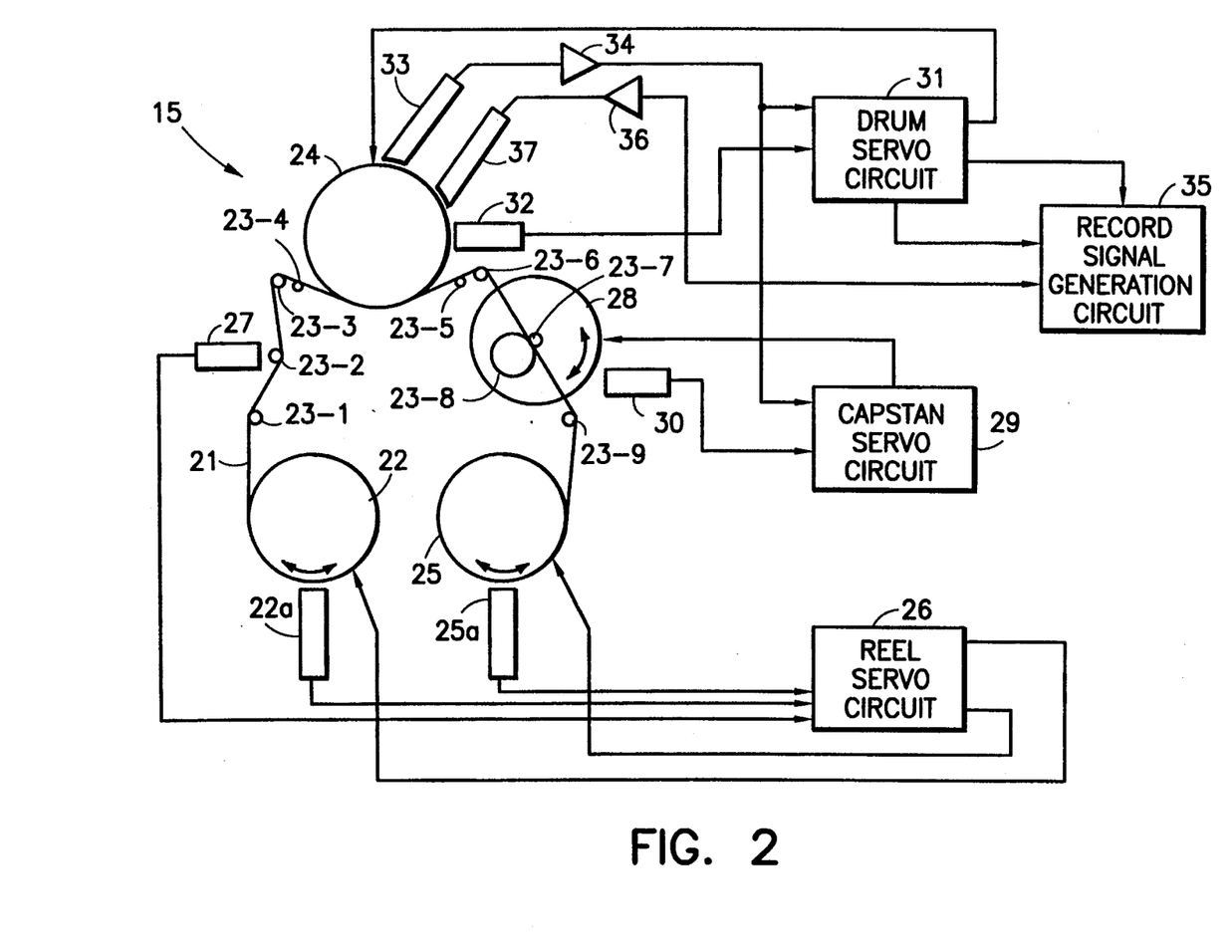
FIG. 2 is a block diagram of an embodiment for making the alignment tape according to the present invention.

Referring now to FIG. 2, an alignment tape recorder 15 includes a supply side reel 22 feeding a magnetic tape 21 to a rotating drum 24. Magnetic tape 21 contacts a 90° section of a rotating drum 24. Magnetic tape is guided on the supply side by a stabilizing post 23-1, a tension post 23-2, an incoming side guide roller 23-3, and an incoming side inclined post 23-4, corresponding to the prior-art elements in FIG. 7. After passing over rotating drum 24, magnetic tape 21 is guided by an outgoing side inclined post 23-5, an outgoing side guide roller 23-6, a capstan 23-7, a pinch roller 23-8 and a stabilizing post 23-9 onto a take up reel 25.

A reel servo circuit 26 controls the rotation of supply side reel 22 and take up reel 25. A supply side sensor 22a on supply side reel 22 detects rotations of supply side reel 22 and outputs a rotation signal to reel servo circuit 26. Similarly, a take-up sensor 25a detects rotations of take-up reel 25 and outputs a second rotation signal to reel servo circuit 26. A tension sensor 27 on tension post 23-2 detects the tension of magnetic tape 21 and outputs a tension signal to reel servo circuit 26. Reel servo circuit 26 then outputs two control signals, one to supply side reel 22, and the other to take-up side reel 25.

Capstan 23-7 is driven by a capstan motor 28. Capstan motor 28 is controlled by a capstan servo circuit 29. A capstan motor sensor 30 detects the rotation of capstan motor 28. Capstan servo circuit 29 produces a driver signal in response to a detection signal from capstan motor sensor 30, which controls capstan motor 28 so that magnetic tape 21 is driven at a fixed or constant speed.

Rotating drum 24 is controlled by a drum servo circuit 31. Drum servo circuit 31 ensures that the rotational speed of rotating drum 24 is constant. For example, the constant rotational speed may be 2000 rpm. Drum servo circuit 31 receives a drum rotation pulse signal through a rotating drum sensor 32, which detects the rotations of rotating drum 24. A playback signal from a magnetic playback head 33, which is fixed on rotating drum 24, is sent to drum servo circuit 31 via a playback RF amp 34. Drum servo circuit 31 outputs a servo signal in response to the playback signal, which controls rotating drum 24 according to the rotation pulse signal.

A record signal generation circuit 35 receives the rotation pulse signal and the servo signal from drum servo circuit 31. Record signal generation circuit 35 generates a record signal in response thereto. The record signal is sent to magnetic recording head 37, fixed on rotating drum 24, via a recording RF amp 36.

Figure 3:
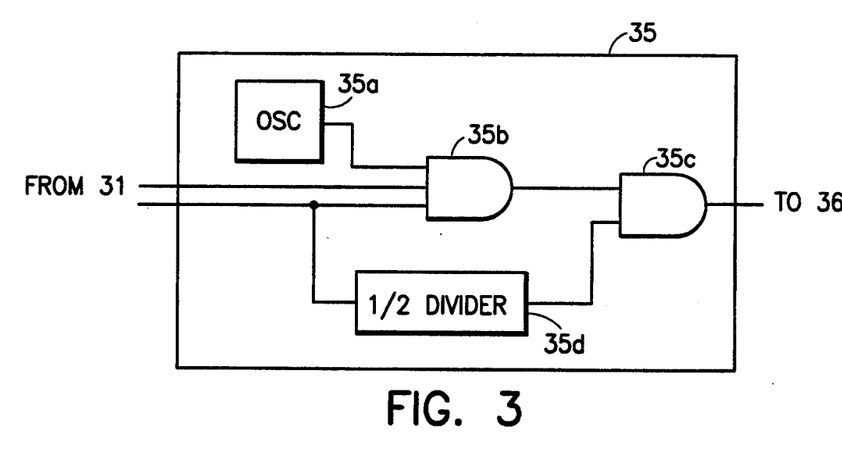
FIG. 3 is a block diagram of the record signal generation circuit according to the present invention.

Referring now to FIG. 3, record signal generation circuit 35 includes an oscillator 35a, which outputs a single wavelength oscillation signal. The single wavelength produces a stable envelope upon playback if correct alignment exists. Otherwise, a declining or increasing reproduced signal is obtained, thereby facilitating mechanical alignment.

Figure 4A:
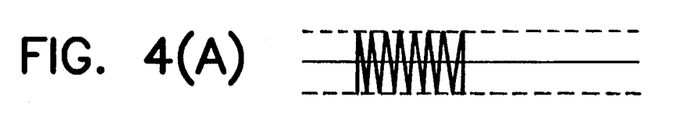
FIG. 4(A) is a predetermined oscillation signal waveform according to an embodiment of the present invention.

The constant-frequency output of oscillator 35a (FIG. 4(A)) is applied to one input of a 3-input AND gate 35b. The drum rotation pulse signal (FIG. 4(B)) and the servo signal (FIG. 4(C)) are applied to the remaining two inputs of 3-input AND gate 35b. The output of 3-input AND gate 35b, the logical sum (AND) of the output oscillation signal, the servo signal and the drum rotation pulse signal (FIG. 4(D)), is input to a 2-input AND gate 35c.

As stated above, one input of 2-input AND gate 35c receives the output of 3-input AND gate 35b. The other input of 2-input AND gate 35c receives the output of a divide-by-two divider 35d.

Figure 4B:
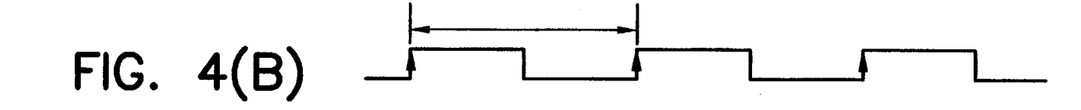
FIG. 4(B) is a drum rotation pulse signal waveform according to the embodiment of FIG. 4(A).
Figure 4C:
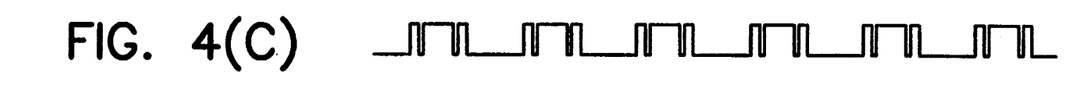
FIG. 4(C) is a servo signal waveform according to the embodiment of FIG. 4(A).
Figure 4D:
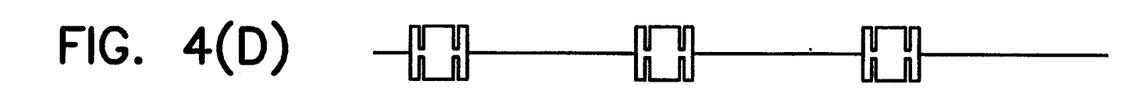
FIG. 4(D) is an intermediate waveform according to the embodiment of FIG. 4(A).
Figure 4E:
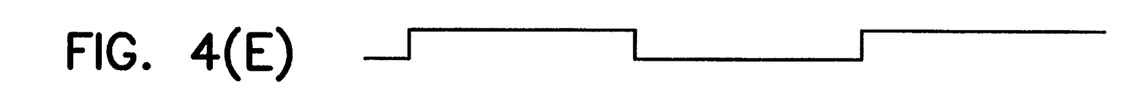
FIG. 4(E) is an output waveform of a divider according to the embodiment of FIG. 4(A).

Referring now also to FIGS. 4(B) and 4(E), divider 35d outputs one pulse for every full rotation of rotary drum 24 (as indicated by the arrow). In effect, divider 35d divides the drum rotation pulse signal by two and functions as a flip-flop. 2-input AND gate 35c outputs the logical sum (AND) of the 3-input AND gate 35b signal and the counter output. This is the output of record signal generation circuit 35. The output of the record signal generation circuit 35, the record signal, is sent to magnetic recording head 37 via a recording RF amp 36. That is, the record signal is generated every fourth track.

Figure 4F:
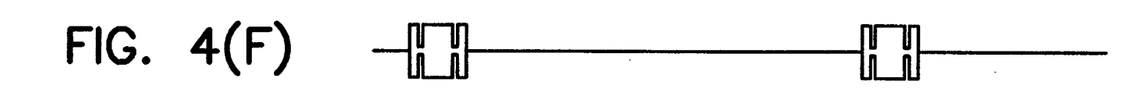
FIG. 4(F) is an output waveform of a record signal generation circuit according to an embodiment of FIG. 4(A).
Figure 4G:
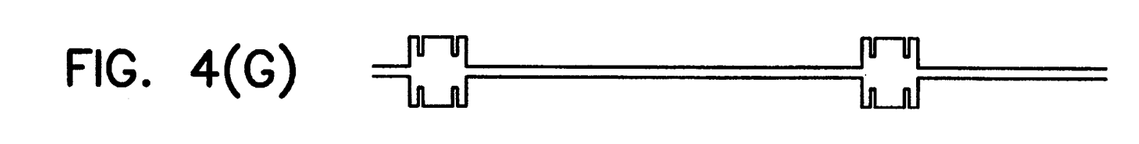
FIG. 4(G) is a playback waveform according to the embodiment of FIG. 4(A).

Referring now to FIGS. 4(A)–(G), the relationship between the above described signals is illustrated. The signals represented in FIGS. 4(A), 4(B) and FIG. 4(C)

are input to 3-input AND gate 35*b*. FIG. 4(A) is the output waveform of oscillator 35*a* (which is expanded for visibility), FIG. 4(B) is the drum rotation pulse waveform and FIG. 4(C) is the servo signal waveform. The signals represented by FIGS. 4(D) and 4(E) are input to 2-input AND gate 35*c*. FIG. 4(D) is the output waveform from 3-input AND gate 35*b* and FIG. 4(E) is the output waveform from divider 35*d*. FIG. 4(F) is the record signal, which is the output waveform of 2-input AND gate 35*c* and the final output of record signal generation circuit 35. FIG. 4(G) is the waveform envelope of the playback signal.

In effect, the record signal is output and the track recorded only once during every two rotations of rotating drum 24. Thus, as shown in FIG. 1, only every fourth track is recorded. It should be noted that the mechanism records tracks in standard formats with highly precise positioning. Thus, a magnetic tape recorded in this manner is useful for alignment of the track of a tape recorder.

Referring back to FIGS. 1 and 2, DAT magnetic tape 11 is placed in an unaligned DAT recorder and played. A switch circuit 38 (FIG. 5) in capstan servo circuit 29, when open during alignment, feeds a fixed voltage through an RF amplifier 40 to capstan motor 28, whereby capstan motor 28 is driven according to the selectable voltage from a regulated voltage supply 38*b*, rather than the playback signal from magnetic playback head 33 and the sensor signal from capstan motor sensor 30. The voltage from regulated voltage supply 38*b* may be varied manually or periodically to produce on-track and off-track states which can be used for alignment of the path of the magnetic tape.

Figure 5:
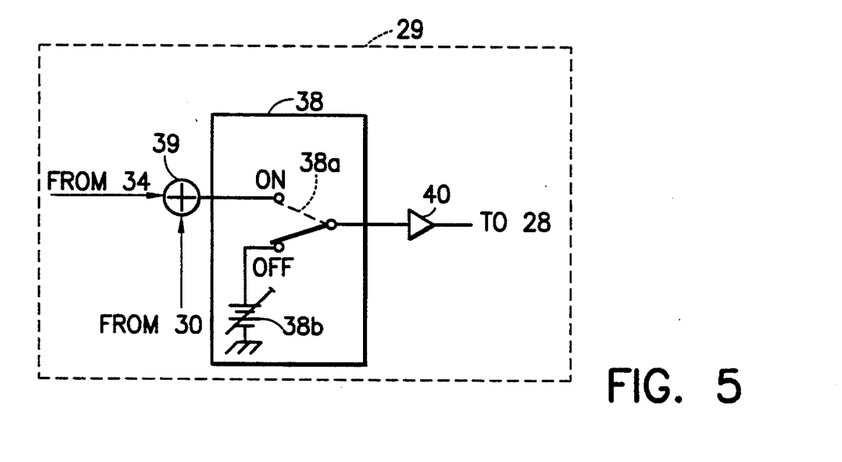
FIG. 5 is a circuit diagram of an embodiment of the switching circuit according to an embodiment of the present invention.

Switch circuit 38 includes switch 38*a* and regulated voltage supply 38*b*. When no alignment is taking place, switch 38*a* is in an on position. An adder 39 sums the sensor signal from capstan motor sensor 30 and the playback signal from magnetic playback head 33. The summation signal is sent to capstan motor 28 through switch 38*a* and RF amp 40.

During alignment, switch 38*a* is in an off position. A fixed voltage is sent from regulated voltage supply 38*b* to RF amp 40 via switch 38*a*, and output to capstan motor 28. Thus, capstan motor 28 rotates at a constant speed. On-track states and off-track states are generated by capstan motor 28 rotating at a constant speed, which is not synchronized with alignment track 11*a*.

Figure 6A:
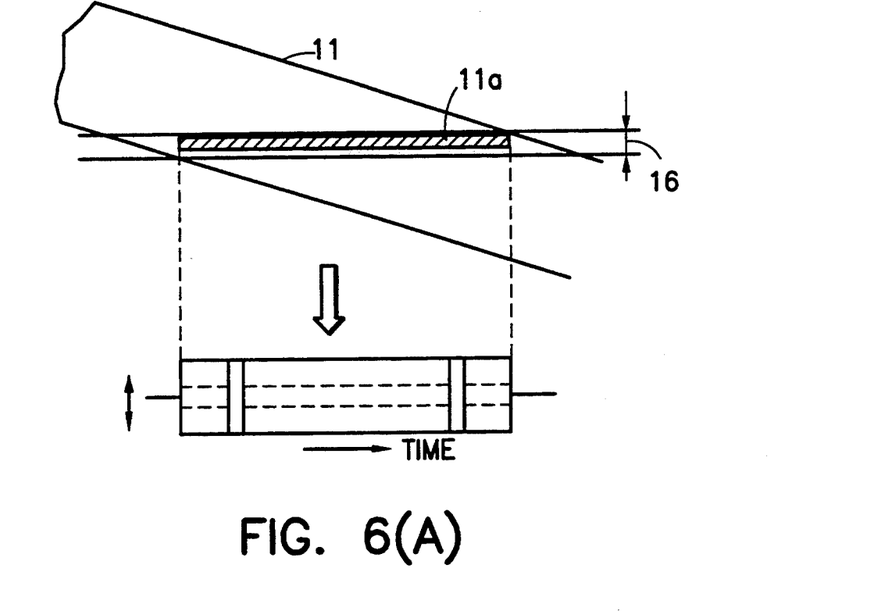
FIG. 6(A) is an envelope waveform of a track not requiring alignment and showing head position relative to track.

Referring to FIG. 6(A), a condition is shown in which a path 16 of magnetic playback head 33 (not shown) closely follows alignment track 11*a*. The lower part of the figure contains a constant-amplitude envelope waveform of the playback signal indicating that alignment is unnecessary.

Figure 6B:
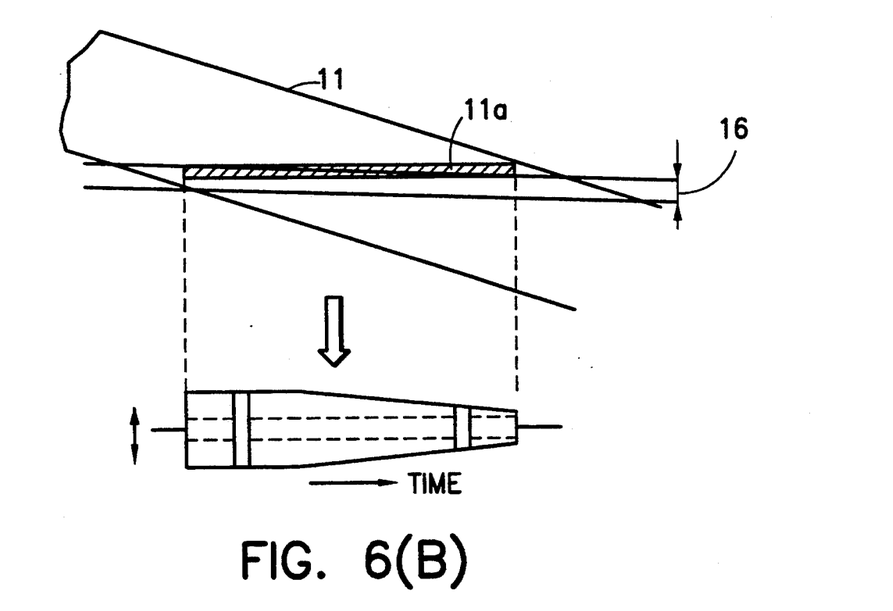
FIG. 6(B) is an envelope waveform of a track requiring alignment and showing head position relative to track.

Referring to FIG. 6(B), a condition is shown in which path 16 of magnetic playback head 33 (not shown) is skewed with respect to alignment track 11*a*. The corresponding envelope waveform in the lower part of the figure shows, from the declining amplitude signal that alignment is necessary.

In the present embodiment, one track is recorded as an alignment track every four tracks, with three blank tracks between them. One skilled in the art will recognize that the spacing between recorded alignment tracks can be greater than the four tracks of the described embodiment. The only requisite is that the alignment tracks are spaced apart at sufficient intervals to prevent interference from a signal recorded in other tracks during an off-track state.

The present embodiment is described in terms of DAT recorders. However, the present invention is not limited to this application, and can be applied to helical scan type devices for magnetic recording and playback, such as 8 mm and VHS VTRs.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for producing alignment tapes for magnetic recording and playback devices, comprising:

said magnetic recording and playback device being of a type effective for playing back a plurality of adjacent recorded tracks on a magnetic tape;

a rotating drum having at least one magnetic head disposed therein;

means for outputting a predetermined oscillation signal; and means for sending said predetermined output signal to said magnetic head at a rate of less than once per tracks, whereby at least one blank track is disposed between each of said plurality of adjacent recorded tracks;

wherein said means for sending further comprises:

first means for outputting a servo signal responsive to a rotation of rotating drum;

second means for outputting a first signal responsive to said servo signal and said a rotation of said rotating drum; and third means for outputting a second signal responsive to said first signal and at least 2 rotations of said rotary drum.

2. A record signal generation circuit for an alignment tape recorder comprising:

said alignment tape recorder including means for generating a drum rotation pulse signal having positive and negative half cycles;

said alignment tape recorder further including means for dividing said drum rotation pulse signal by two to produce a divided drum rotation pulse signal having positive and negative half cycles;

said alignment tape recorder further including means for producing a servo signal;

an oscillator producing an oscillation signal;

logic means for taking a logic product of said rotation pulse signal, said divided drum rotation pulse signal, said servo signal and said oscillation signal to produce an output signal at a frequency of said oscillation signal occurring once for every fourth occurrence of said servo signal.

* * * * *